United States Patent [19]
Aldenhoff

[11] 3,774,011
[45] Nov. 20, 1973

[54] MULTIPLE ARC DIRECT CURRENT CONSTANT POTENTIAL WELDING GENERATOR

[75] Inventor: Bernard J. Aldenhoff, Oconomowoc, Wis.

[73] Assignee: A. O. Smith Corporation, Milwaukee, Wis.

[22] Filed: Jan. 13, 1971

[21] Appl. No.: 106,168

[52] U.S. Cl............ 219/131 R, 219/135, 323/22 SC
[51] Int. Cl................................................ B23k 9/10
[58] Field of Search.................... 219/137, 135, 110, 219/133; 322/28, 36, 73; 323/22, 37

[56] References Cited
UNITED STATES PATENTS

| | | | |
|---|---|---|---|
| 2,777,047 | 1/1957 | Stevens, Jr. | 219/131 R |
| 3,505,587 | 4/1970 | Carroll et al. | 219/135 |
| 3,284,694 | 11/1966 | Roof et al. | 322/73 |
| 3,366,870 | 1/1968 | Hemmenway et al. | 322/28 |
| 3,525,924 | 8/1970 | Atterholt | 322/73 |

Primary Examiner—J. V. Truhe
Assistant Examiner—George A. Montanye
Attorney—Andrus, Sceales, Starke & Sawall

[57] ABSTRACT

A multiple arc welding generator supplies a presettable direct current constant potential output to a plurality of welding arcs which are individually initiated and terminated. A controlled rectifier bridge includes individual gated rectifiers connected to a pulse source and selectively supplies unidirectional current to the field of the generator from an alternating current supply of the usual 60 cycle supply system. A resistive sensing circuit is parallel connected to the plurality of paralleled arcs and is connnected through a resistive element to supply a linear proportional generator output voltage signal to a signal summing point. A direct current reference source is connected to supply a presettable constant potential reference signal of opposite polarity to the same signal summing point to combine with the proportional generator voltage signal and supply a control signal to the pulse source which maintains the output voltage constant within each electrical cycle of the alternating current input.

7 Claims, 2 Drawing Figures

PATENTED NOV 20 1973

3,774,011

3,774,011

MULTIPLE ARC DIRECT CURRENT CONSTANT POTENTIAL WELDING GENERATOR

BACKGROUND OF THE INVENTION

This invention relates to a multiple arc welding system for supplying direct current constant potential power to a plurality of welding arcs from a welding generator.

Direct current arc welding systems may be generally classified as variable potential or constant potential systems and also may be classified as single arc or multiple arc systems. Each particular system or operation is subject to many operating conditions peculiar to the specific mode of operation. For example, a variable potential system supplies a voltage output varying from a maximum at open circuit to zero at short circuit according to a predetermined response. A constant potential system, on the other hand, provides a preset output voltage and the current varies according to the rate at which the electrode is fed along the workpiece.

The stability of the operating voltage supplied to a constant potential operation in a multiple arc system must be particularly controlled to permit satisfactory welding as the number of individual operating arcs change.

Generally, in multiple arc welding systems, undesirable arc variations are encountered when individual operators initiate or cease a welding arc. Thus, transient voltage conditions are created which are extremely detrimental to the continuing other arcs and result in improper welds, particularly when welding in a constant potential multiple arc welding system.

For example, a welding generator for a preset constant potential output in single welding arc systems have been suggested wherein a power source is connected to an arc means through a gating circuit controlled by a pulse source, for example, as shown in the patent to Carroll et al, U. S. Pat. No. 3,505,587, issued Apr. 7, 1970. As more fully disclosed therein, a presettable reference signal is connected to supply a fixed preset voltage to a pulse control transistor base circuit. The generator output voltage is sensed and a control signal is coupled through an inductive circuit to a transistor emitter circuit within the pulse source.

SUMMARY OF THE INVENTION

This invention relates to a multiple arc welding system employing a D.C. welding generator for simultaneously supplying direct current constant potential power to a plurality of welding arcs.

Applicant realized that the supply must respond to a change of line voltage or loading of the generator within a single cycle of the supply in order to maintain the desired arc stability for a plural arc system. In accordance with the present invention, a welding generator field is selectively supplied with unidirectional current from a single phase alternating current source such that the generator provides a preselected constant voltage output with correction for line or load changes within each electrical cycle of the source current to a plurality of independently operated parallel connected welding arcs. An electronic gated circuit controlled by a pulse source selectively connects the alternating current source to the generator to supply a controlled unidirectional current. A voltage summing point is connected to directly summate an arc voltage signal and a reference signal and provide a net control or error signal to the pulse source to control conduction through the gating circuit. A direct current reference source is connected to the summing point to supply a presettable constant potential reference signal at the summing point. A non-inductive resistive circuit is connected in parallel to the parallel connected welding arcs and includes an intermediate point for instantaneously providing a signal proportional to the output voltage of the generator. The intermediate point is connected by a coupling resistor to the summing junction or point to maintain the non-inductive coupling and provide a proportional welding voltage signal having an opposite polarity of the constant potential reference signal to the signal summing point. In a preferred and novel circuit, a summing transistor is connected in a common emitter follower configuration with the base connected to the summing junction and the output coupled to control a current control transistor in series with a capacitor. A unijunction transistor has its gate connected to the capacitor and a pulse transformer connected in the base circuit. The emitter follower configuration establishes a high input impedance with accurate voltage summing at the summing point. Applicant has found that the direct conductive connection of the constant potential reference signal and the proportional welding voltage signal, which linearly combine to supply a summated control signal indicative of the change in the welding generator output voltage to the pulse source, establishes a very rapid response and within one cycle of the commercial 60 cycle supply. As a result, the circuit effectively controls the control current to the welding generator and thereby maintains the preselected constant voltage to the plurality of arcs, with a reset of the arc voltage within a single electrical cycle of the source and thus provides a novel and practical multiple arc source.

BRIEF DESCRIPTION OF THE DRAWING

The drawing furnished herewith illustrates the best mode presently contemplated by the inventor and clearly discloses the above advantages and features as well as others which will be readily understood from the detailed description thereof.

In the drawing.

DESCRIPTION OF THE PREFERRED ILLUSTRATED EMBODIMENT

Figure 1:
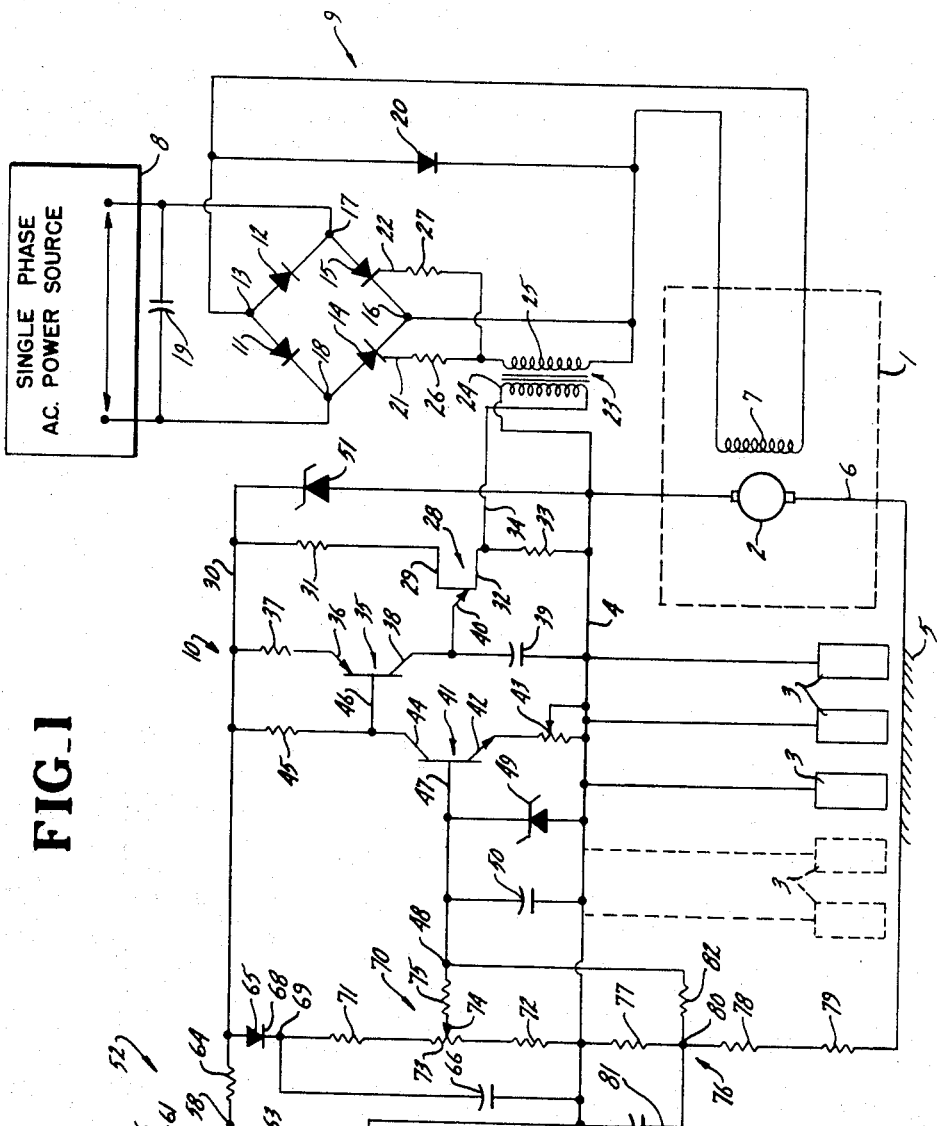
FIG. 1 is a schematic view of a multiple arc welding system for supplying direct current constant potential power to a plurality of welding arcs.

Referring to FIG. 1, the illustrated embodiment of the invention includes a rotating multiple arc welding generator 1 having an armature 2 connected to supply direct current constant potential power to a plurality of independently operated electrodes 3 through a welding output line 4. The armature 2 is further connected to one or more workpieces 5 through a line 6 which normally constitutes an effective ground to welding generator 1.

The welding generator 1 is energized by unidirectional current supplied to a field winding 7 in accordance with the selective connection to a single phase A.C. power source 8 through a gated rectifying circuit 9. The operation of rectifying circuit 9 is controlled by a variable pulse source 10 which will be described in greater detail hereinafter.

The gated rectifying circuit 9 contains a pair of diodes 11 and 12 each having their anodes connected to an output terminal 13 and a pair of thyristors 14 and 15 each having their cathodes connected to an output terminal 16. The diodes 11 and 12 and the thyristors 14 and 15 are connected in a bridge circuit configuration with the cathode of diode 12 and the anode of thyristor 15 connected to an input terminal 17 while the cathode of diode 11 and the anode of thyristor 14 are mutually connected to an input terminal 18. The input terminals 17 and 18 are connected to the power source 8 to receive a single-phase alternating current. A capacitor 19 is connected across input terminals 17 and 18 while a diode 20 is connected across output terminals 13 and 16 to protect the rectifying circuit 9 from severe transient operating conditions.

The thyristors 14 and 15 may consist of silicon controlled rectifiers (SCR) each having a gating circuit 21 and 22, respectively, capable of receiving a control pulse from the pulse source 10 through a transformer 23 to render the respective silicon controlled rectifiers conductive. Specifically, each SCR will conduct whenever the relative voltage of the incoming single-phase alternating current signal applied to the anodes is more positive than the voltage of the respective cathodes and a control pulse exists at gates 21 and 22. Due to the alternating nature of the incoming current, only one SCR will be biased to conduct during each half cycle so that alternate conduction is permitted as controlled by the pulse source 10.

The transformer 23 contains a primary winding 24 connected to the pulse source 10 and a secondary winding 25 connected to supply control pulses to gate circuits 21 and 22 through resistors 26 and 27, respectively.

In operation, a positive half cycle of current supplied by source 8 will flow through input terminal 18, SCR 14 if properly biased to conduct by pulse source 10, output terminal 16, field coil 7, output terminal 13, diode 12 and return through input terminal 17 to source 8. In like manner, a negative half cycle of current supplied by source 8 will flow through input terminal 17, SCR 15 if properly biased to conduct by pulse source 10, output terminal 16, field winding 7, output terminal 13, diode 11, and return through input terminal 18 to source 8.

The pulse forming circuit 10 is controlled as hereinafter described to supply timed control pulses to rectifying circuit 9 to allow conduction during a selected portion of each incoming current half cycle to effectively control the amount of unidirectional current applied to field coil 7. Specifically, a unijunction transistor 28 is provided having a first base circuit 29 connected to a voltage bias line 30 through a fixed resistor 31 and a second base circuit 32 connected to output line 4 through a fixed resistor 33. The second base circuit 32 is further connected to primary winding 24 of transformer 23 through an output line 34. A current control transistor 35 is shown as a PNP type transistor having an emitter 36 connected to bias line 30 through a fixed resistor 37 and a collector 38 connected to output line 4 through a charging capacitor 39. An emitter 40 of unijunction transistor 28 is shown connected to the juncture of collector 38 of transistor 35 and charging capacitor 39.

In accordance with the illustrated embodiment of the invention, an emitter folloer transistor 41 couples the control transistor to a summing junction or point. Transistor 41 is shown as an NPN type having an emitter 42 connected to output line 4 through a variable resistor 43 and a collector 44 connected to bias line 30 through a fixed resistor 45. A base circuit 46 of transistor 35 is connected to the juncture of collector 44 and the fixed resistor 45. The transistor 41 contains a base circuit 47 connected to an input terminal 48 and further connected to output line 4 through a parallel connected Zener diode 49 and capacitor 50.

A Zener diode 51 is connected between output line 4 and bias line 30 to limit the allowable voltage applied to pulse source 10 for protection from transient conditions which might otherwise damage the elements.

In operation, the voltage signal established at input terminal or summing point 48 is supplied to base circuit 47 to permit conduction by transistor 41. Consequently, a voltage appears at base input 46 of current control transistor 35 proportional to the voltage signal at summing point 48. Transistor 35 is therefore biased to conduct current to capacitor 39 at a time rate proportional to the voltage at base 46 and therefore proportional to the voltage at summing point 48. The capacitor 39 is allowed to charge until the firing voltage of unijunction transistor 28 is reached. When charged to a sufficient level, capacitor 39 rapidly discharges through the emitter 40 of transistor 28 into base circuit 32 to provide a voltage drop across resistor 33 which further appears across the primary winding 24 of transformer 23. It is therefore evident that a pulsed output will be supplied to the secondary 25 of transformer 23 whenever capacitor 39 has been charged to a level sufficient to permit a discharge through unijunction transistor 28.

The frequency of pulses supplied to transformer 23 is directly proportional to the charging rate of capacitor 39 and therefore proportional to the voltage appearing at summing point 48.

A direct current reference voltage source 52 is provided to supply a presettable constant potential reference signal to the summing point 48. A power source 53 is connected to a full-wave rectifier 54 through an isolating transformer 55 and supplies a single-phase alternating current signal. The power source 53 may be connected to power source 8 or may be connected to an independent source of power. The rectifier 54 includes a diode bridge circuit and is connected to transformer 55 by a pair of input terminals 56 and 57. A unidirectional output current is supplied at a pair of output terminals 58 and 59 through the operation of a plurality of diodes 60 through 63 in a well known full-wave rectifier operation.

A voltage dividing network is connected to the rectifier 54 through a constant voltage stabilizing circuit. Specifically, a fixed resistor 64 is connected to the output terminal 58 of rectifier 54 and to bias line 30. A rectifying diode 65 is connected to bias line 30 and to output line 4 through a filtering capacitor 66. The output terminal 59 of bridge circuit 54 is connected to output line 4 through a line 67. A cathode 68 of diode 65 and capacitor 66 are mutually connected to form a terminal 69 to supply a constant voltage output.

A resistive voltage dividing network 70 is connected to terminal 69 to supply an adjustable constant D.C. reference voltage to summing point 48. Specifically, a pair of fixed resistors 71 and 72 and a resistor 73 having an adjustable output tap 74 are serially connected between terminal 69 and output line 4. The summing point 48 is connected to the adjustable tap 74 through a fixed coupling resistor 75 to receive a presettable constant potential reference signal.

A resistive output voltage sensing circuit 76 is connected between output line 4 and workpieces 5 to sense the voltage therebetween. Specifically, a plurality of fixed resistors 77, 78 and 79 are serially connected between output terminal 4 and workpiece 5, respectively. The resistors 77 and 78 are mutually connected to form an output terminal 80 providing a signal proportional to the welding voltage applied to the plurality of independently operated welding electrodes 3. A capacitor 81 is connected between terminal 80 and output line 4 to smooth or eliminate undesirable transient conditions. The proportional output voltage, as sensed at output terminal 80, is supplied to summing point 48 through a fixed coupling resistor 82. The voltage occurring at the summing point 48 is provided by the summation of the two direct current voltages which establishes an error voltage at the base controlling the conduction of the pulse network.

Figure 2:
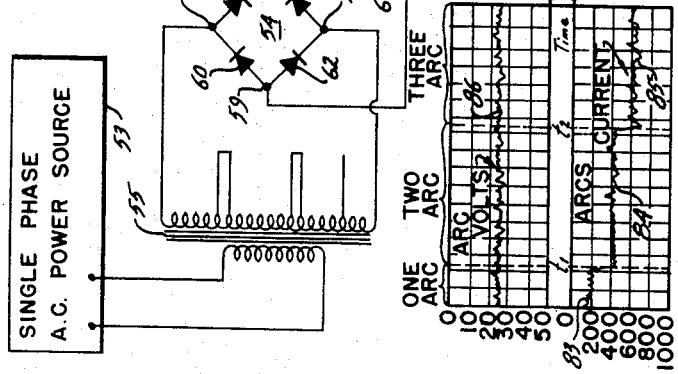
FIG. 2 is a typical graphical illustration representing the welding current supplied to each of a plurality of arcs shown in FIG. 1 as a function of time and further representing the welding voltage supplied to the plurality of welding arcs shown in FIG. 1 for the identical function of time corresponding to the welding current representation for specifically showing the constant voltage output under varying current outputs for operation with one arc, two arcs, and three arcs, respectively.

The supply of current to field coil 7 is therefore controlled by pulse source 10 to maintain a preselected constant potential output voltage from generator 1, and with a response within each electrical cycle of current supplied by source 8 regardless of the energization or de-energization of the individual electrodes 3. The lower portion of FIG. 2 shows a graphical illustration of the current supplied by the generator 2 to the electrodes 3 under various operating conditions. At time = 0, a current waveform 83 is provided with only one arc in operation. At time = $t_1$, a current waveform 84 is provided with two electrodes in operation while at time = $t_2$, a current waveform 85 is provided with three electrodes in operation. The additional operating electrode 3 added at times $t_1$ and $t_2$ do not significantly vary the output voltage waveform 86 as shown in the upper portion of FIG. 2. Thus, welding operators operating a welding electrode 3 may initiate or cease a welding operation without appreciably affecting the efficient and satisfactory operation of other arcs.

It is therefore evident that the control signal supplied to pulse source 10 from summing point 48 is a combination of the presettable constant potential reference signal supplied by source 52 and the proportional output voltage signal supplied by the resistive output voltage sensing circuit 76. Under normal operation, the signal supplied by sensing circuit 76 is of an opposite polarity to the signal supplied by source 52 so that an increase in output welding voltage will linearly decrease the control signal at summing point 48, and vice versa.

The non-inductive and resistive nature of the sensing circuit 76 connected to summing point 48 therefore enables a plurality of independently operated welding electrodes 3 to be satisfactorily employed with a welding generator 1 having a preselected constant voltage within every electrical operating cycle of the input power signal irrespective of the specific energization or de-energization of certain arcs.

Various modes of carrying out the invention are contemplated as being within the scope of the following claims particularly pointing out and distinctly claiming the subject matter which is regarded as the invention.

I claim:

1. A multiple arc welding system for supplying direct current constant potential power to a plurality of welding arcs, comprising a plurality of independently operated electrodes each adapted to selectively provide a welding arc, a welding generator having an input means for controlling output voltage and a direct current output consisting of a plurality of separate paralleled output terminals for establishing a constant potential output voltage and directly connected to said electrodes for supplying essentially the full constant potential voltage as the welding power in a plurality of parallel circuits for independently establishing and maintaining individual welding arcs at said electrodes, an alternating current input means, an electronic gated means connected to said input means of said generator and to said alternating current input means for supplying selected portions of said alternating current input power to said generator input means and including an external control means for initiating current flow through said gated means when actuated to control the output voltage of said generator, a pulse source when actuated connected to actuate said external control means, a direct current reference means for selectively supplying a presettable constant potential reference signal, and a sensing network connected to said reference means and to said output circuit and connected to actuate said pulse source during each cycle of the input current to maintain a constant output voltage independent of load and line circuit changes and resetting said voltage within essentially a single cycle of the alternating current input power.

2. The welding system of claim 1, wherein said sensing network includes a pair of resistors serially connected and having a juncture defining an intermediate point with one resistor connected to a workpiece and the other resistor connected to said output circuit, and a conducting resistor connecting said intermediate point to said pulse source.

3. The welding system of claim 1, wherein said reference means includes, a transformer connected to receive an alternating current voltage signal, a full wave rectifier connected to said transformer and having a pair of output terminals to supply a uni-polarity signal, a connecting resistor serially connected to one of said rectifier output terminals, and a filter circuit parallel connected to said connecting resistor and including a diode serially connected to a parallel connected capacitor and resistive branch, said resistive branch including a first resistor having a center tap connected through a second resistor to a signal summing point defining a common connection between said direct current reference means and said sensing network.

4. The system of claim 1, wherein said pulse source includes a summing point connected to said reference means and to said sensing network.

5. The system of claim 4, wherein said reference means includes a first, second and third resistors serially connected to a full wave rectifying circuit, said second resistor having a variable tap output connected to said summing point through a fourth resistor.

6. The system of claim 4, wherein said sensing network includes a fifth, sixth and seventh resistor serially connected with said fifth resistor connected to said output circuit and said seventh resistor connected to a plurality of workpieces, said fifth and sixth resistors forming a juncture connected to said summing point through an eighth resistor.

7. A multiple arc welding system for supplying direct current constant potential power to a plurality of welding arcs, comprising, means for providing alternating current input power, a direct current power source having an input means for controlling output voltage and including an output circuit consisting of a plurality of separate paralleled output leads and having an electronic gated means connected to an external control means for conducting selected portions of said alternating current input power to said input means when actuated to control the output voltage to said output circuit, a plurality of independently operated electrodes each connected directly to a respective one of said plurality of parallel output leads for selectively providing a plurality of welding arcs, a pulse source when actuated connected to actuate said external control means, a direct current reference means for selectively supplying a presettable constant potential reference signal, and a sensing network connected to power. reference means and to said output circuit for sensing the voltage at said plurality of electrodes and connected for actuating said pulse source during each cycle of the input current to maintain a constant output voltage at each of said plurality of separate parallel connected electrodes independent of load and line circuit changes and resetting said voltage within essentially a single cycle of the alternating current input power.

\* \* \* \* \*

UNITED STATES PATENT OFFICE
CERTIFICATE OF CORRECTION

Patent No. 3,774,011                    Dated November 20, 1973

Inventor(s) Bernard J. Aldenhoff

It is certified that error appears in the above-identified patent and that said Letters Patent are hereby corrected as shown below:

| | |
|---|---|
| Col. 7 line 18 (Claim 7) | Cancel the comma (,) after comprising |
| Col. 8 line 14 (Claim 7) | Cancel "power." and substitute therefor ---said--- |

Signed and sealed this 30th day of July 1974.

(SEAL)
Attest:

McCOY M. GIBSON, JR.　　　　　　　　C. MARSHALL DANN
Attesting Officer　　　　　　　　　　Commissioner of Patents